E. M. LOVELL.
NUT LOCK.
APPLICATION FILED AUG. 22, 1908.
925,927. Patented June 22, 1909.
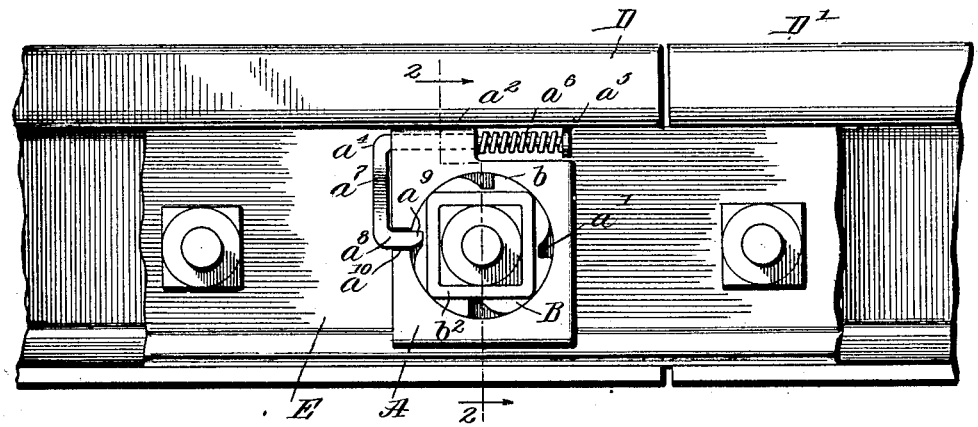
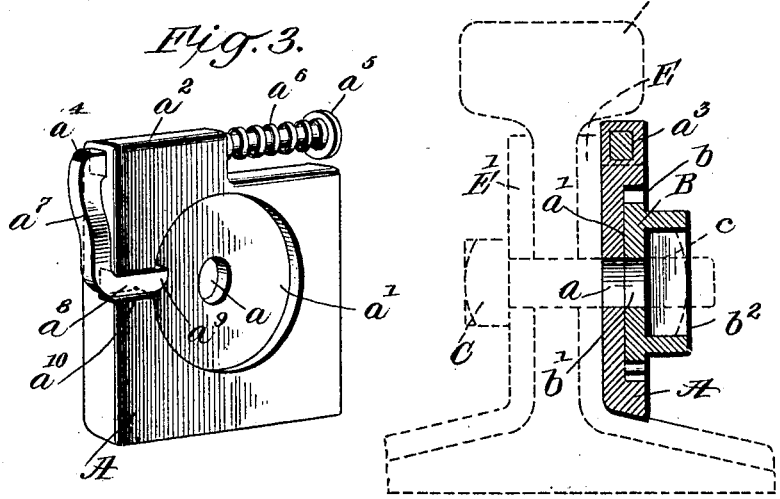
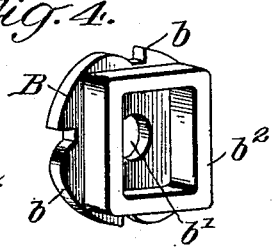
WITNESSES
Samuel E. Wade.
C. E. Trainor
INVENTOR
EDWIN M. LOVELL,
BY Munn & Co.
ATTORNEYS

UNITED STATES PATENT OFFICE.

EDWIN M. LOVELL, OF STANBERRY, MISSOURI.

NUT-LOCK.

No. 925,927.  Specification of Letters Patent.  Patented June 22, 1909.

Application filed August 22, 1908. Serial No. 449,800.

*To all whom it may concern:*

Be it known that I, EDWIN M. LOVELL, a citizen of the United States, and a resident of Stanberry, in the county of Gentry and State of Missouri, have invented certain new and useful Improvements in Nut-Locks, of which the following is a specification.

My invention is an improvement in nut locks, and consists in certain novel constructions and combinations of parts hereinafter described and claimed.

Referring to the drawings forming a part hereof, Figure 1 is a view of a portion of a pair of abutting rails provided with my improvement. Fig. 2 is a section on the line 2—2 of Fig. 1. Fig. 3 is a perspective view of a portion of the lock and Fig. 4 is a similar view of another portion.

The present embodiment of my invention comprises a washer A, substantially rectangular in shape, and provided at its center with an aperture $a$ for receiving the bolt C. The washer is also provided with a circular depression $a'$ coaxial with the opening $a$ for receiving the washer B to be presently described. A portion of the top of the washer is cut away to form a lug $a^2$, and the lug is provided with an opening $a^3$ polygonal in cross section therethrough, within which is received a sliding bar $a^4$ of similar cross section, having its inner end rounded and provided with a head $a^5$, and a coil spring $a^6$, is arranged between the head and the washer. The opposite end of the sliding bar $a^4$, is bent downwardly as at $a^7$, and inwardly as at $a^8$, the free end thereof being beveled as at $a^9$ and extending within the circumference of the circular depression as clearly shown in Fig. 3, the washer being cut away as at $a^{10}$ to permit the passage of the portion $a^8$ of the bar.

The washer B before mentioned, is provided on its periphery with a plurality of ratchet teeth $b$, and at its center with an aperture $b'$ for receiving the bolt C. On one of its faces, the washer is provided with an integral casing or socket $b^2$ rectangular in cross section, for receiving the nut $c$ as shown in Figs. 1 and 2.

The device is shown applied for securing rails together, the rails D, D', being placed in abutting relation, and connected by fish plates E, E'. The bolt C is inserted through the registering openings of the fish plates and the rails, and the washer A is placed thereon. It will be observed that the washer A is of sufficient size so that the upper edge engages the under surface of the tread of the rail while the lower edge engages the upper surface of the flange of the rail, or the upper surface of the fish plate, when an angular plate is made use of, this arrangement preventing the rotation of the washer A. The nut is now placed in the socket and the washer B is turned until it occupies the position shown in Figs. 1 and 2, the sliding bar $a^4$ being in the position shown in Figs. 1 and 3.

It will be evident from the description, that a reverse movement of the washer B, is prevented by the engagement of the portion $a^8$ with the ratchet teeth, the said portion forming a catch or pawl for coöperating with the ratchet teeth.

When for any reason the nut becomes loose, it may be tightened merely by applying a wrench to the socket and turning the washer B. When it is desired to release the nut, the pawl is moved to the left of Fig. 1, until the catch $a^8$ is disengaged from the ratchet teeth.

It will be observed that the slide bar $a^4$ is square, and that the passage $a^3$ in the washer A is also square, to prevent turning of the sliding bar, unless the said bar is moved to the left far enough to disengage the squared portion of the bar from the socket after which the sliding bar may be turned to retain it in its outward position.

I claim:

1. A nut lock comprising a washer provided with a central aperture for receiving the bolt, and with a circular depression coaxial with the aperture, said washer having a lug provided with a passage polygonal in cross section, a slide bar movable in the passage, and also polygonal in cross section, the inner end of the bar being provided with a head, and the outer end with a catch normally extending within the circumference of the circular depression, a spring arranged between the head and the lug, and a second washer arranged to fit within the circular depression, and provided on its periphery with ratchet teeth for engagement by the catch, said washer having a central aperture for receiving the bolt, and a socket on its face for receiving the nut.

2. A nut lock comprising a washer having an aperture for receiving the bolt, and a circular depression coaxial with the aperture, a second washer provided on its periphery with ratchet teeth, and fitting within the circular depression, said washer having a central aperture for receiving the bolt, and a socket for receiving the nut, and a slidable spring actuated catch on the first washer for engaging the ratchet teeth.

3. A nut lock comprising a pair of washers, each having an aperture for receiving the bolt, one of said washers being substantially rectangular and the other circular, the last named washer being provided on its face with a socket for receiving the nut, and on its peripheral edge with ratchet teeth, and a slidable spring actuated catch on the first named washer for engaging the teeth to lock the washers with respect to each other.

EDWIN M. LOVELL.

Witnesses:
R. S. LIGGETT,
A. C. FRISBIE.